(12) United States Patent
Smith (10) Patent No.: US 8,464,436 B2
(45) Date of Patent: Jun. 18, 2013

(54) TAPE MEASURE WITH UTENSIL HOLDER AND TAPE BRAKE

(76) Inventor: Braden Smith, Lafayette, CO (US)

( * ) Notice: Subject to any disclaimer, the term of this patent is extended or adjusted under 35 U.S.C. 154(b) by 0 days.

(21) Appl. No.: 12/969,216

(22) Filed: Dec. 15, 2010

(65) Prior Publication Data

US 2011/0138644 A1 Jun. 16, 2011

Related U.S. Application Data

(60) Provisional application No. 61/284,187, filed on Dec. 15, 2009.

(51) Int. Cl.
*G01B 3/10* (2006.01)
*B43L 9/04* (2006.01)

(52) U.S. Cl.
USPC ............... 33/760; 33/668; 33/768; 33/27.032

(58) Field of Classification Search
USPC .......... 33/760, 668, 768, 770, 27.031, 27.032
See application file for complete search history.

(56) References Cited

U.S. PATENT DOCUMENTS

| | | | | |
|---|---|---|---|---|
| 2,807,886 A | * | 10/1957 | Aciego | 33/668 |
| 4,914,830 A | * | 4/1990 | Legare | 33/668 |
| 4,976,037 A | * | 12/1990 | Hines | 33/27.03 |
| 5,172,486 A | * | 12/1992 | Waldherr | 33/770 |
| D336,443 S | * | 6/1993 | Dickey | D10/74 |
| 5,577,329 A | * | 11/1996 | States | 33/768 |
| 5,671,543 A | * | 9/1997 | Sears | 33/668 |
| 5,992,038 A | * | 11/1999 | Harmon et al. | 33/768 |
| 6,223,443 B1 | * | 5/2001 | Jacobs | 33/27.03 |
| 6,574,881 B2 | * | 6/2003 | Cole, III | 33/668 |
| 6,725,560 B2 | * | 4/2004 | Smith | 33/668 |
| 6,880,260 B2 | * | 4/2005 | Baida | 33/668 |
| 7,191,530 B1 | * | 3/2007 | Thibodeaux | 33/27.032 |

* cited by examiner

*Primary Examiner* — Christopher Fulton (57) ABSTRACT

A tape measure with a utensil holding device for holding a variety of elongated utensils for cutting, scoring, marking and scribing incorporating a quick release clamping cam and a threaded adjustment means with a substantially forceful tape brake utilizing a lever and cams to securely lock the tape at a specified measurement. The utensil holding device and tape brake are so configured as to be assembled with the parts on either side of the tape measure to accommodate individual preferences; the utensil being available on one side of the tape or the other; the tape brake lever on either side of the tape measure housing.

8 Claims, 11 Drawing Sheets

Fig. 10A SECTION A-A

Fig. 10

Large marker

Marker

Carpenter's Pencil

Regular Pencil or Pen

Nail

Fig. 17B SECTION A-A

TAPE MEASURE WITH UTENSIL HOLDER AND TAPE BRAKE

CROSS REFERENCE TO RELATED APPLICATIONS

This application claims priority based upon a previous Provisional Patent Application No. 61/284,187, filed Dec. 15, 2009

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to measuring devices, such as tape measures, with an integrated clamping means for holding marking, cutting, and scoring utensils to be used while measuring.

Tape measures have for a long time routinely been used by a wide variety of trades people together with other utensils to measure, mark, cut, score, and scribe various materials. Most generally, a pencil or marker will be used to indicate a particular length. Present tape measures are convenient if the user needs only to make one or two marks in a convenient position. Often, however, the user will have to create a series of marks at the same distance over and over, frequently these distances will be end-to-end such as for studs in a wall or rows of shingles on a roof. This requires locating the desired length on the tape each time and can be time consuming especially when the length is an odd fraction. Adding odd fractional measurements can also be a source of human error.

Other methods require the striking a line (or cutting) parallel to an edge. Such is often employed by those cutting plywood or drywall to narrow the material by a certain measurement. This is accomplished by maintaining a length of the tape, generally by using the feeble tape brake provided on the case, and holding a utensil such as a knife or pencil, against the tape measure case while sliding the tape hook on the end of the tape along an edge. This method may fail to create a uniformly straight line; the utensil may slip out of position, or the tape brake may slip.

In some instances the measurement is not critical, but a consistency of measurement is. For example, it may be desirable to paint a border on a wall. Visually, the thickness may need to be consistent but perhaps not of a critical width. Therefore, a means of establishing a consistent length with the ability to mark would be reasonable.

Also, a measurement may need to be transferred from one distance to another. For example, a drywall contractor may need a particular length of material to finish a wall. Currently, he will take the measurement, record it, perhaps just in memory, then recall the measurement when marking and cutting the required piece. This, of course, can be another source of, error if due to lack of memory. A means of transferring the measurement physically could avoid a costly mistake as well as saving time by not having to discern exact measurements, first on the wall and again when cutting the material.

It is often very difficult to measure and mark while on a ladder or in an awkward position, such as close to the ceiling or floor. By having a predetermined distance established with a marking tool, one does not need to read the tape to make the mark, nor use both hands, one of which may be more useful for holding onto a ladder. Thus, safety as well as convenience could result from a utensil holding tape measure.

The user will often want to use a utensil in its native form apart from the tape measure. This, for instance, may be to write a note if the utensil is a pencil or marker, or trim a small bit of material if the utensil is a knife. Thus a quick release would be a convenient feature.

Because several different utensils may be used, from a small nail to scratch a mark to large markers, an adjustment means to accommodate such variations is also desired. This adjustment means also can provide a fine tuning of the clamping pressure so as to ensure adequate resistance and mitigate risk of damage to the utensil.

It is also convenient to accommodate users that have differing preferences for which hand they use; they might want the freedom to affix the utensil or tape brake to either side of the tape or housing.

For these reasons, a device that securely unites the utensil with a tape measure can save time, errors, frustration, and painful, costly accidents. Much of this is understood and has been explored by several patents on record. Prior patents for many years include the benefits of combining marking or cutting instruments with a tape measure in various other ways; U.S. Pat. No. 1,613,676 (N. W. Raphael) provides for a marking device and tape measure in a very simple form dating back to 1927. U.S. Pat. No. 812,322 (T. N. Badger) incorporates a ruling pen or pencil point to a tape measure in 1906. U.S. Pat. No. 259,556 (J. C. Kulman) combines a cutting instrument with a tape measure from 1882.

There are devices that attach to existing tape measure housings, such as U.S. Des. Pat. No. 336,443 (Dickey), U.S. Pat. Nos. 2,807,886 (A. B. Aciego), 3,336,678 (Chamberlain et al.), 4,760,648 (Doak et al.), 5,477,619 (Kearns), 5,671,543 (Sears), 6,041,513 (Doak), 6,574,881 (Cole, III), 6,725,560 (Smith).

Others incorporate the device integrally into the housing, U.S. Pat. Nos. 4,630,376 (Pentecost), 4,914,830 (Legare'), 4,965,941 (Agostinacci), 5,295,308 (Stevens et al.), 5,435,074 (Holevas et al.), 5,809,662 (Skinner), 6,434,854 (MacColl et al.), 6,612,046 (Cimorell et al.), 6,698,104 (Scarborough).

Some attach the utensil to the end of the tape, U.S. Pat. Nos. 2,651,843 (A. J. Goodford), 4,976,037 (Hines), 6,212,787 (Dixon).

Although the marking or cutting device could work reasonably well on the end of the tape, the awkwardness of maintaining the tape housing and utensil when the tape is recoiled would be annoying. Since the tape is flexible, the utensil would not be securely fixed. This could bend and destroy the tape, having much weight and leverage applied. The other main problem would be the recoil of the tape. Most tape measures are spring loaded to retract the tape and can be quite fast. When this happens any slight weight on the end of the tape becomes dangerous, especially if was a knife.

Generally, a tradesman has become accustomed to working with a specific set of utensils that are currently produced, such as a particular type of pencil or marker. Therefore, in considering the user's preferences it would be reasonable to allow the user to choose his favored utensil to incorporate with the tape measure. Because of this, having a utensil clamping means, and one that accepts a wide variety of instruments, is preferable to a new marking system incorporated into the housing.

Of the designs that integrate a utensil holding means upon the housing, some prior art employs springs, some use setscrews, and some merely use a friction fit to maintain the instrument in position. The problem with the springs and friction fit is the force required to maintain an adequate resistance to hold the utensil will also work against the user when desiring to remove the utensil for other uses. The set screw certainly would solve this but would have limitations of its own. It is difficult to create a combination of a holder and set screw that could accommodate a large variety of utensil sizes without becoming unreasonably large and bulky. Because these tape measures are often carried in pouches designed for a specific size, this would be an inconvenience. Furthermore, a set screw can direct a force in such a small area as to break the utensil, especially if made of a softer material such as wood, graphite, chalk, or wax.

There is also in the prior art much to do about providing an indexing means to align the utensil tip with the graduated marks of the tape. This actually may be a hindrance to the effectiveness of the system because an indicator may also, while allowing a precise alignment, cover portions of the tape and make a quick reading difficult. Some patents provide clear plastic windows, magnifying glasses, or triangular indicators. Any item covering the tape may become dirty or scratched and work against its own objective by further obscuring the tape.

The tape brake on such a tape measure will also be of great concern and surprisingly little in the prior art has addressed this feature. In use, the tape measure will be preset to a defined distance. The user will then catch the end of the tape hook on an edge of material and strike the utensil on the material. Often, this will be repeated, and with a hurried approach the user may put a great deal of force on the tape hook. This would create a problem if the tape brake is not strong enough to withstand the force and the tape gets pulled out, even if a little. Several repetitions could add up to a large mistake. In order to maintain an accurate measurement a strong tape brake will need to be employed. The means of braking will also need consideration as some tape brakes will move the tape when applied. If the brake moves the tape the measurement will be slightly off. Also, a tape brake that provides enough force to withstand movement, but over too small an area, may have a tendency to distort the tape, and, over time, wrinkle, deform, and ultimately destroy the tape.

Much of the prior art describes complicated bulky contraptions with a multitude of moving parts. This is understandable as it is much easier to obtain a patent with such a design. However, the most useful, durable, inexpensive, and attractive tools are simple and elegant systems that use a minimum of parts, each working together to accomplish a task Therefore, considering the aforementioned prior art disadvantages, there is an opportunity for a tape measure with a utensil holding device that can secure a variety of marking, cutting, scribing, and scoring utensils; that can hold securely without damaging the utensil; having a quick release mechanism provide the utensil in its native form; having also an adjustment for accommodating a variety of utensils and fine tuning the clamping pressure; being able to mount in a secondary position, the utensil being able to appear on either side of the extended tape; having also a tape brake providing substantial pressure to resist movement while affording that the tape is not deformed, nor moved when braked; allowing a configuration to either side of the tape housing. This new design will be safer, more efficient, more economical, more accurate, more accommodating for the above mentioned reasons and for reasons of preference of type of utensil, position of utensil, and position of tape brake.

BRIEF SUMMARY OF THE INVENTION

This invention generally comprises a tape measure of common constitution, having an extendable recoiling graduated flexible tape, a housing substantially surrounding said tape when recoiled, an opening in said housing through which the tape is extended, a brake to hold the tape at a specified extended length when extended, and integrated into said housing a utensil holding device.

The utensil holding device incorporates a utensil positioning means, for directing utensils, said utensils' shape being primarily elongated along an axis with a generally consistent cross, such as a pen or pencil, in this case, but not limited to, a concave groove in the exterior of said housing, having two planar surfaces at an angle to one another which are connected by a curved surface. This groove guides the utensil such that it is restrained to move along the axis of elongation of the utensil. The groove is presently formed on the front of the housing, disposed to one side, and angled such that the utensil is angled backward. As a result, the working tip of the utensil, such as the tip of a knife, the felt of a marker, or the graphite of a pencil, etc. will be advanced from the housing at the bottom, disposed beside the tape when the tape is extended. It should be noted that this positioning means shall not be limited to this configuration but is merely a convenient example. Other embodiments will be discussed later.

Adjacent to and laterally offset from the positioning means is a threaded fastener having male and female members with engaged threads. Said threaded fastener is substantially perpendicular to the axis of the utensil. The fastener engages the utensil by means of a pivoting jaw. Said pivoting jaw has a generally "C" shape, with horizontal top and bottom portions connected by a vertical portion. The fastener passes through the center of the jaw. Said jaw employs a hinged end, in this embodiment using hooked ends that pivotally engage cylindrical portions of the housing. The form of the jaw is fairly thin and provides uninhibited visual access to the tape and utensil tip.

A clamp cam assembly attached to the fastener provides a quick release clamping action. Said clamp cam assembly comprises a ridged metal clamp bracket and a pivoting cam. The fastener passes through a hole in the bracket, having an accessible widened portion, such as a knurled head, that forcibly engages the bracket on one side of the hole. On either side of the hole in the bracket are flanges having holes through which pins pivotably engage a cam clamp. An opening in said cam straddles the clamp bracket and knurled head, providing force upon the jaw when rotated back against the housing and releasing force when rotated out away from the housing. When rotated away from the housing, said opening in the cam provides space for manipulation of the knurled head of the fastener. In this configuration, the fastener allows for both gross movement of the clamp cam assembly as well as fine adjustment of the system. Once adjusted, the cam then provides a quick release and clamping of the utensil.

The tape brake is actuated by a lever on the outside of the housing. By rotating said lever in one direction the tape is secured; rotating it the other way releases the brake. A camshaft inside the housing, attached to said lever, is rotated when the lever is rotated. Cams on the camshaft press a cam shoe down upon the tape and sandwich the tape between the shoe and a rubber clamping surface on the inside of the housing. A secondary cam on the camshaft is configured to push upward against a horizontal boss attached to the cam shoe, lifting the cam shoe up and out of the way of the tape when the lever is rotated opposite the releasing direction.

OBJECTS AND ADVANTAGES

A primary object of this invention is to provide a tape measure with a utensil holding means having a convenient quick release to access and use said utensils. For example this has the advantage of being able to retrieve a pencil to write a note with one's hand and then quickly replace it in the tape measure.

Another object is to provide a secure clamp by using a cam to provide pressure upon the utensil.

Another object is to provide a ridged pivoting jaw whereby the cam may affect pressure upon the utensil. Said pivoting jaw being so formed as to maintain a low profile; providing uninhibited visual access to the tape and utensil tip.

Another object is to accommodate a wide variety of utensils; said utensils having various cross sectional shapes and sizes.

Another object is to allow easy insertion of utensils into the holding means by flaring the edges of the jaw outward.

It is yet another object of this invention to provide an adjustment means to the utensil holding device. This adjustment means shall allow the invention to hold utensils with a variety of sized cross sections.

Another object is to provide a fine tuning to the adjustment of the utensil holder.

Another object is to provide convenient access to the adjustment means through an opening in the cam.

Another object is to be able to remove said utensil holding means and affix it to the housing in a secondary position. Generally, the utensil will be disposed with the tip to one side of the tape when the tape is extended. The utensil holding means may be positioned in a secondary position such that the tip of said utensil is disposed to the other side of the tape.

Another object is to equip the tape measure with a firm tape brake. Said tape brake making use of cams to affect substantial pressure upon the tape so as to prevent slippage during rigorous use.

Yet another object is to provide a tape brake that does not move the tape when the brake is applied.

A further object of the invention is to distribute the tape brake force so as not to change the shape of the tape.

Another object is to provide clear access for the tape to recoil into its housing.

Another object is to provide substantial leverage to the tape brake by means of a lever on the outside of the housing.

Another object is to be able to position said lever on the other side of the housing.

It is yet another object to provide an ergonomic, compact, and aesthetically pleasing overall design incorporating the above mentioned objects working together.

BRIEF DESCRIPTION OF THE DRAWINGS

FIG. 15B Section J-J shows a section view of FIG. 15B.

DESCRIPTION OF THE PREFERRED EMBODIMENT

Figure 1:
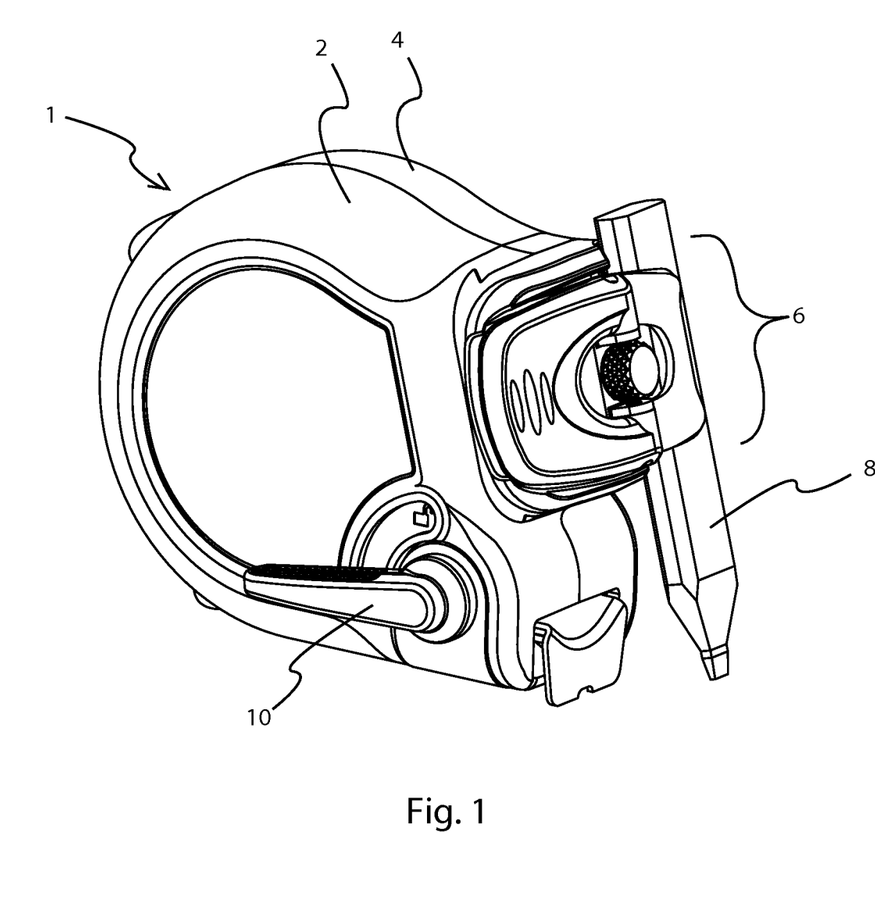
FIG. 1 is a perspective view of the present invention.

Referring to FIG. 1, a tape measure (1) is constructed of common style having two sides of a housing (2 and 4) made of suitable material such as plastic or metal. A utensil holding device (6) on the front, incorporated into said housing, secures a utensil (8), in this drawing a carpenter's pencil, onto the tape measure. A lever (10) is rotated to secure the tape at a specified extended length.

Figure 2:
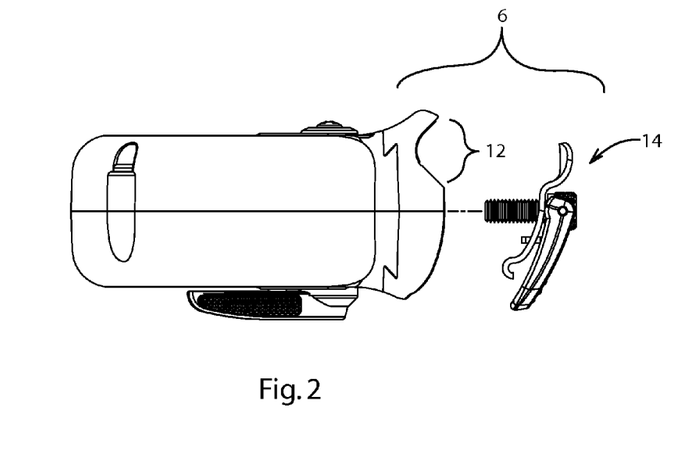
FIG. 2 is a top and slightly angled view showing the utensil clamping means separated from the housing.

Now referring to FIG. 2, looking down from a slightly angled top view, the tape measure is shown in partially separated view. Utensil holding device (6) has a utensil positioning means (12), and a utensil clamping means (14), removed in the illustration.

Figure 3:
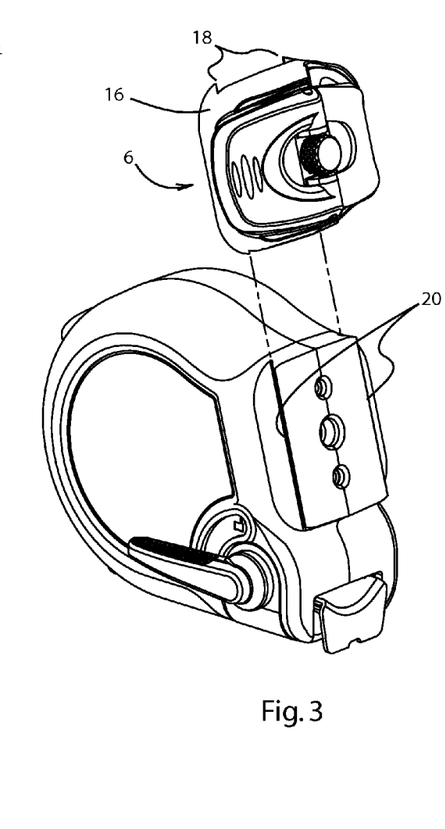
FIG. 3 is a perspective view showing the utensil holding device being removed from the housing.

Referring to FIG. 3, utensil holding device (6) has been removed by means of a detachable portion (16) of the housing, the portion having an interlocking dovetail groove (18) that engages with a dovetail rail (20) on the housing. This dovetail mate allows the utensil holding device to be engaged in either of two positions, with the utensil on one side of the tape or the other.

Figure 4:
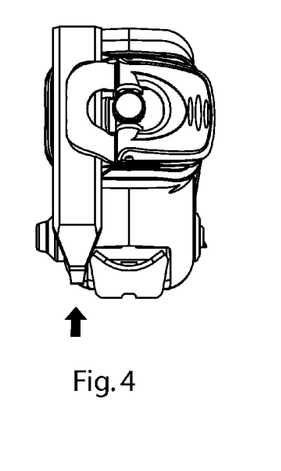
FIG. 4 is a front view illustrating one position of the utensil holding device; the utensil disposed on the left side of the tape.

Referring to FIG. 4, viewing from the front, the utensil holding device has been positioned such that the utensil is on the left side of the tape.

Figure 5:
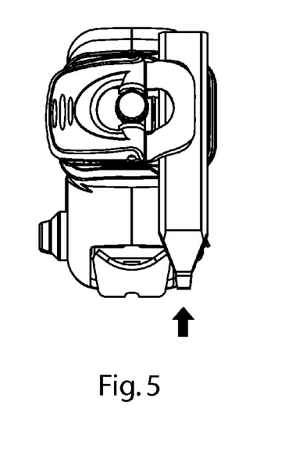
FIG. 5 is a front view illustrating one position of the utensil holding device; the utensil disposed on the right side of the tape.

Referring to FIG. 5, again viewing from the front, the utensil holding device has been positioned such that the utensil is on the right side of the tape.

Figures 6, 7:
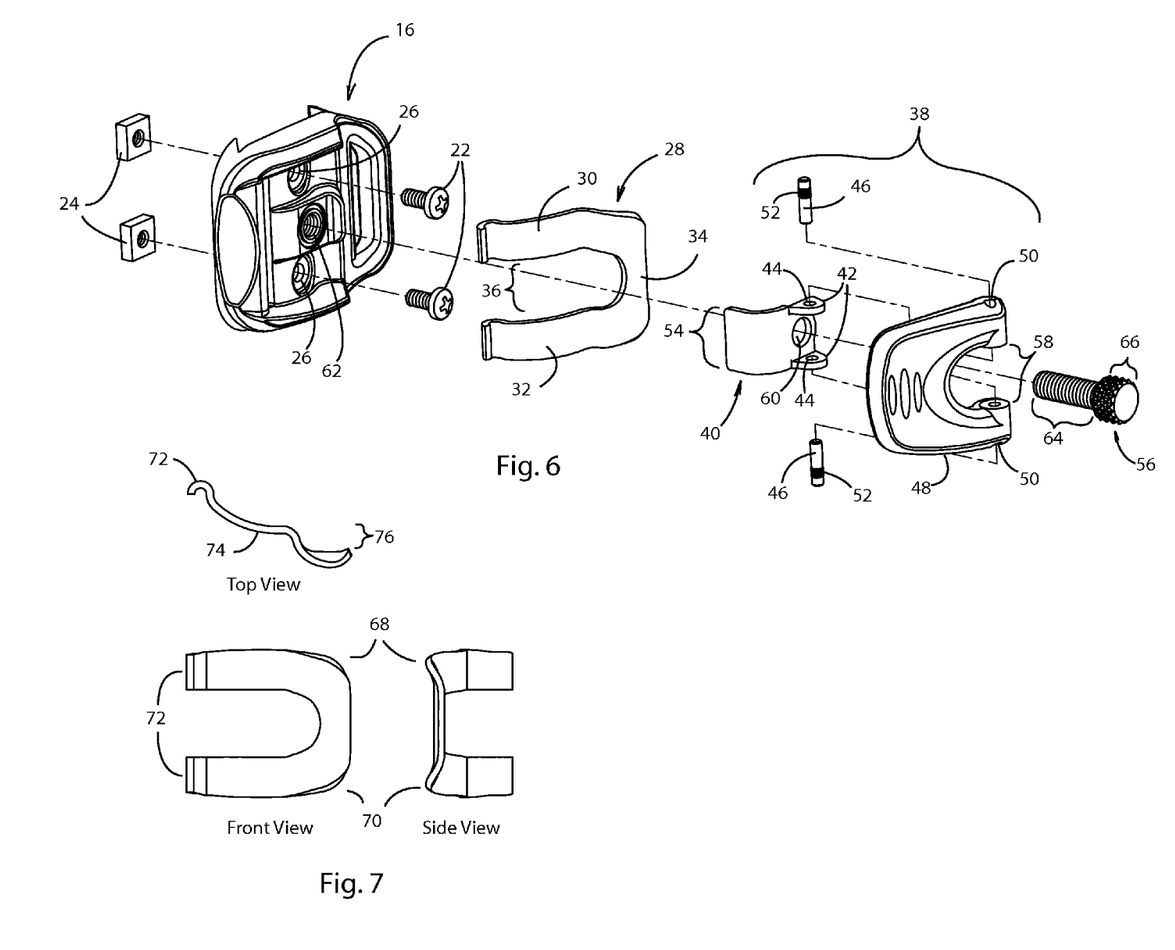
FIG. 6 is an exploded view of the utensil holding device.
FIG. 7 is an orthographic drawing of the pivoting ridged jaw.

Referring to FIG. 6, an exploded view is shown illustrating the components of the utensil holding device. The detachable portion (16) of the housing is removeably fixed to the housing (not shown) using two screws (22) and two square nuts (24) which are captured inside the closed housing (not shown). The screws pass through holes (26) in the detachable portion. A ridged jaw (28), formed of a thin ridged material such as metal, is generally "C" shaped having an upper horizontal portion (30) and a lower horizontal portion (32) connected by a vertical portion (34) providing an opening (36). A clamp cam assembly (38) has a clamp bracket (40) having two flanges (42) with holes (44) that pivotally receive dowel pins (46) for the purpose of allowing a cam (48) to pivot. The pins are securely fixed into holes (50) in the cam, having an interference knurl (52) for this purpose. A wide flange (54) on the bracket curves toward the attachment and is received in the opening (36) in the ridged jaw, preventing the clamp cam assembly from rotating. A threaded fastener (56), in this embodiment being a thumb screw, passes through an opening (58) in the cam and further through a hole (60) in the clamp bracket, on through the opening (36) in the jaw and into a threaded insert (62) in the detachable portion. In the current configuration, the threaded fastener (56) has a threaded portion (64) and a wider, knurled head (66) for ease of manipulation by a user's fingers.

Referring now to FIG. 7, the top (68) and bottom (70) of said vertical portion of the jaw are flared out away from the housing to aid in inserting the various utensils. Looking at the top view of FIG. 11, the jaw has hooked ends (72) that provide a hinging engagement to the housing. In the top view, from the hooked ends, the jaw curves down and toward the right to provide a proud surface (74) for the cam to press against. This surface is curved such that the cam will always be pressing perpendicular to the jaw as it pivots in relation to the housing. The jaw then curves down further making a jog (76) that allows the cam to stay somewhat flush with the furthest out portion of the jaw, allowing the user a clear view of the tape when looking down upon it.

Figure 8:
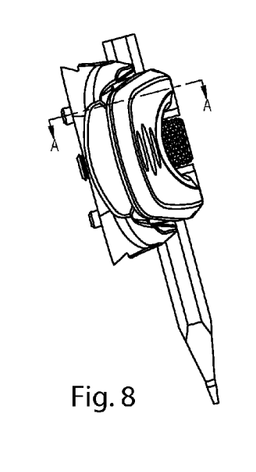
FIG. 8 is a side view of the of the utensil holding device in the clamped position.
Figure 8A:
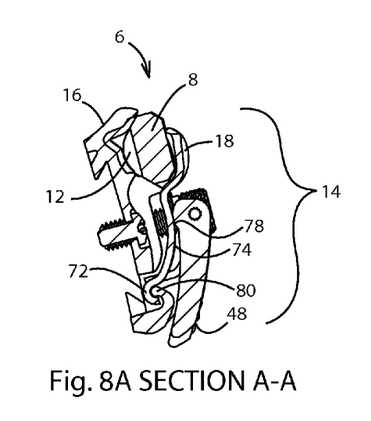
FIG. 8A shows Section A-A of FIG. 8.

Referring to FIG. 8A Section A-A, the utensil holding device (6) is shown in cross section with the detachable portion (16) and utensil clamping means (14) united in the clamped position. The hinged cam (48) is rotated back against the housing, providing pressure between a first cam surface (78) and the proud surface (74) of the jaw. The utensil (8) is held into utensil positioning means (12) by ridged jaw (18). The hooked ends (72) of the jaw pivotally engage with a cylindrical portion (80) of the housing.

Figures 9, 9A:
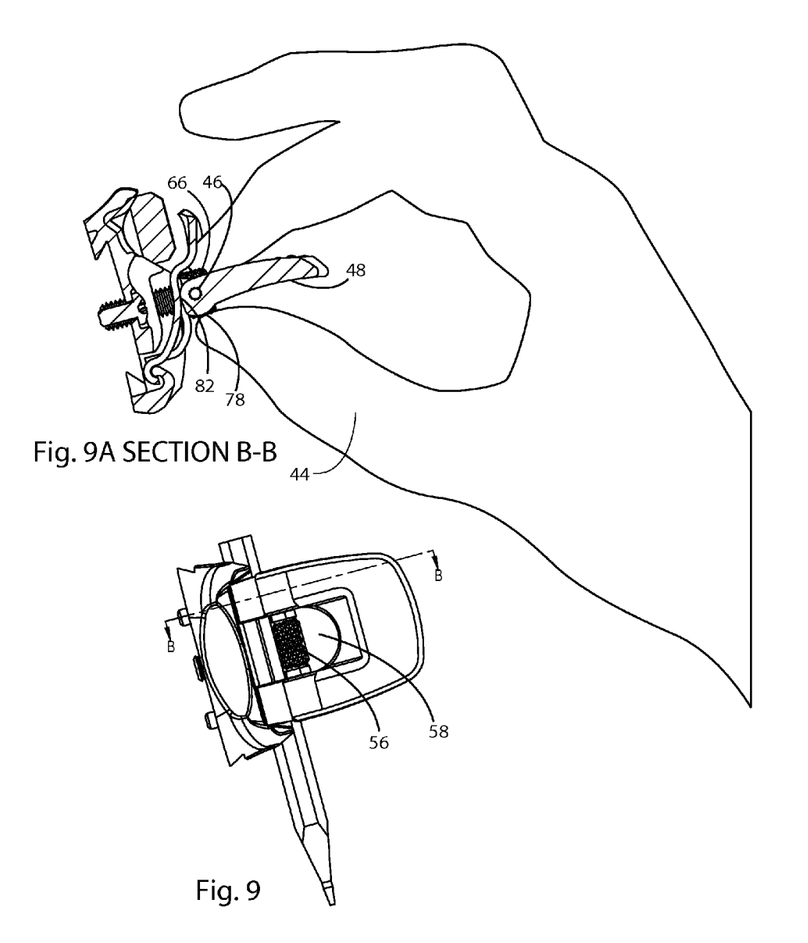
FIG. 9 is a side view of the utensil holding device in the un-clamped position.
FIG. 9A shows Section B-B of FIG. 9 with a hand manipulating the threaded fastener.

Referring to FIG. 9A Section B-B, the device is in the unclamped position, the cam (48) having been rotated away from the housing. A second cam surface (82) on the cam, being closer to the dowel pins (46) of the cam than the first cam surface (78), allows the pressure to be released when the cam is rotated out and away from the housing. This position of the cam allows for rotational manipulation of the knurled head (66) of the threaded fastener by the thumb and fingers of a hand (44).

FIG. 9 illustrates the opening (58) in the cam through which knurled head of the threaded fastener may be accessed.

Figure 10:
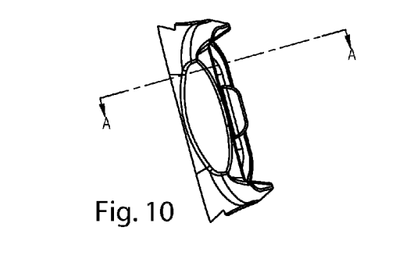
FIG. 10 is a side view of part of the utensil holding device.
Figure 10A:
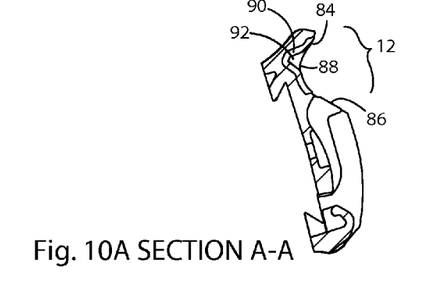
FIG. 10A shows Section A-A of FIG. 10.

Referring to FIG. 10, section A-A shows the detachable portion cross section. The utensil positioning means (12) is presently shaped as a concave "v" groove, having a first planar side (84) and a second planar side (86) set at an angle to each other, with a rounded surface (88) connecting them. This configuration is intended to accommodate a variety of utensils, the bodies of which are primarily elongated having a generally consistent cross section along an axis, such as a pencil or pen. Any configuration that restrains the utensil to movement along the utensil axis would work. A rubber coating (90) provides friction to hold the utensil in the groove. This coating has an indentation (92) that receives the end of the clamp to enable the clamp to rotate far enough to clamp small radius utensils such as a thin nail.

Figure 11:
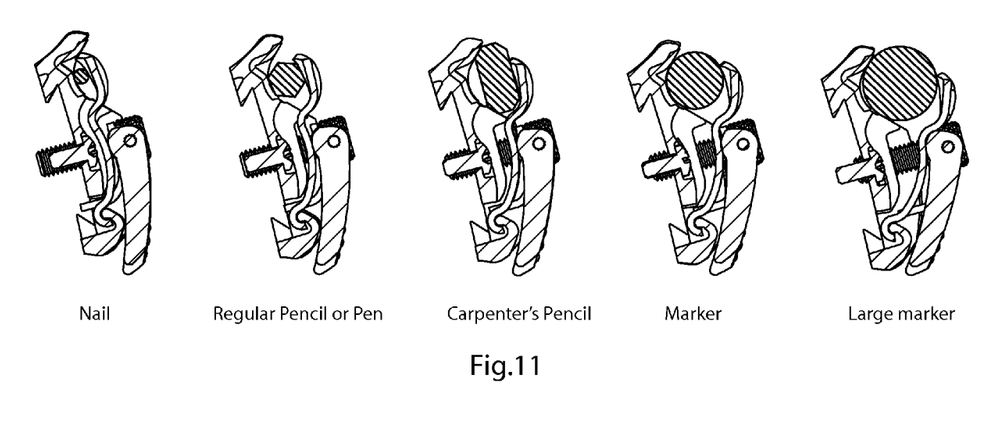
FIG. 11 illustrates various cross sections of different utensils in the utensil holding device.

Referring to FIG. 11, five section views are shown with various utensils employed in the clamp. The first from the left is a nail, the next a regular pencil or pen, then a carpenter's pencil, a marker such as a Sharpie™, then a large marker of 0.625" diameter.

Figure 12:
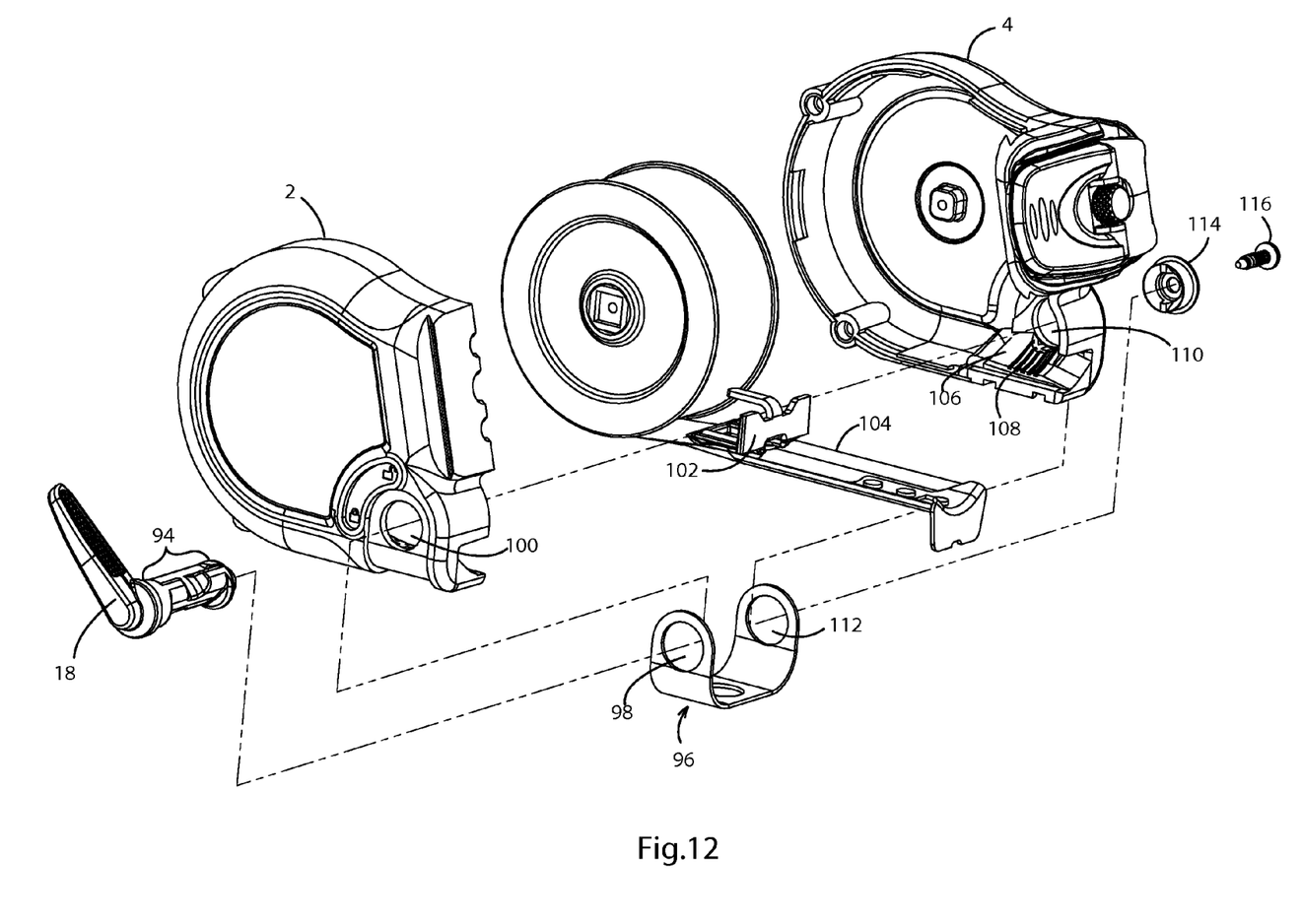
FIG. 12 is an exploded view illustrating the parts of the tape brake.

Referring to FIG. 12, an exploded view of the tape measure is shown illustrating the parts of the tape brake mechanism. The lever (10) has a camshaft (94) that passes perpendicularly through a lever support (96) via a first hole (98) in the lever support and on through the side of the housing (2) via a first hole (100) in the housing. Inside the housing is a cam shoe (102) that is pressed against a tape (104) when the lever is rotated. Underneath the tape is a rubber clamping surface (106) on the inside of both sides of the housing (2 and 4) that has shallow serrations (108) much like the tread on a tire to aid in friction. The shaft exits the other side of the housing (4) via a second hole (110) and through the other side of the lever support via a second hole (112). A cap (114) is held to the end of the shaft by a screw (116) pivotally securing the lever in the case. The cam shoe is held by the housing such that it can move vertically as determined by the camshaft.

Figure 13:
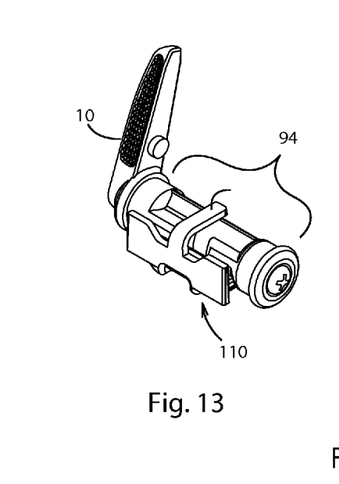
FIG. 13 is a perspective view of the tape brake in a released position.
Figure 14:
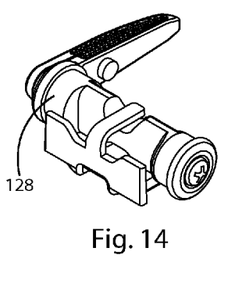
FIG. 14 is a perspective view of the tape brake in a locked position.

Considering now FIGS. 13 and 14, the tape brake mechanism is illustrated. The lever, camshaft and cam shoe are shown engaged with each other. FIG. 13 illustrates the position of the shoe with the lever up allowing free movement of the tape. FIG. 14 illustrates the lever and shoe with the lever in the down and locked position. The tape and case are not shown for simplicity.

Figure 13A:
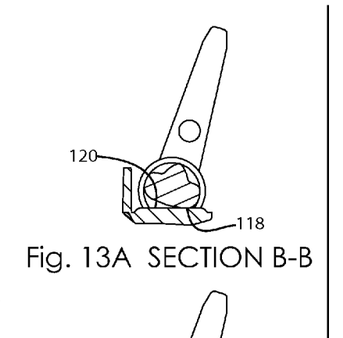
FIGS. 13A, 13B, and 13C illustrate cross sections of the tape brake in a released position.
Figure 13B:
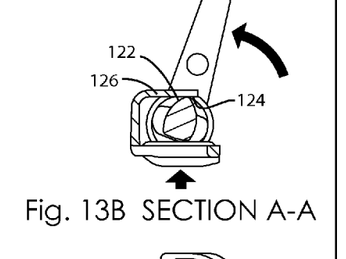
Figure 13C:
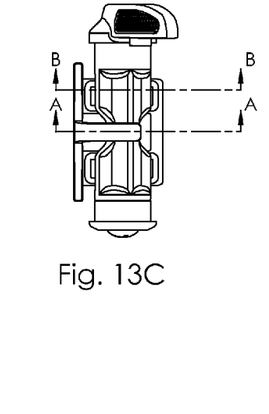
Figure 14A:
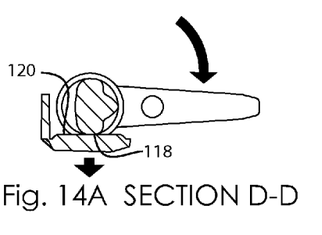
FIGS. 14A, 14B, and 14C illustrate cross sections of the tape brake in a locked position.
Figure 14B:
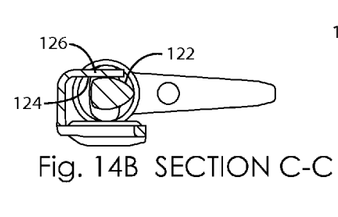

Referring to FIGS. 13 and 14, the lever (10) is attached to the camshaft (94) having brake cams (118), (FIG. 13A Section B-B and FIG. 14A Section D-D) that press down upon a surface (120) of the cam shoe below the shaft when the lever is rotated down (FIG. 14A Section D-D). This action presses the cam shoe against the tape creating a friction brake. The shaft also has a lifting cam (122), (FIG. 13B Section A-A and FIG. 14B Section C-C) that acts against a surface (124) on a lifting boss (126) on the cam shoe above the shaft, lifting the cam shoe when the lever is rotated up. This lifting action provides a clear passage for the tape when recoiling and prevents the shoe from dragging on the tape.

Referring to FIG. 14, a cylindrical bearing surface (128) is shown.

Figures 14C, 14D:
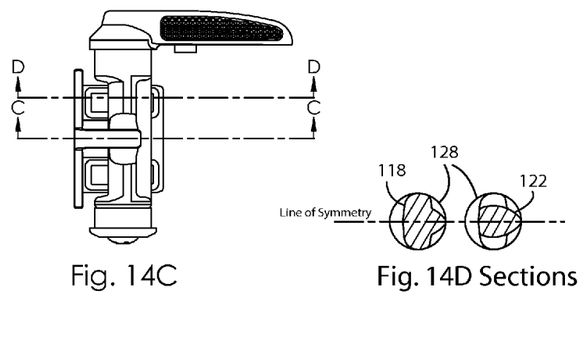
FIG. 14D illustrates section views of the cams of the tape brake.

Referring to FIG. 14D Sections, the cross sections of the cams (118 and 122) are confined within a cylindrical bearing surface (128) of the camshaft along the length of the shaft. Both cams are symmetrical about a horizontal center line when the lever is rotated down. This allows the camshaft to be inserted into the case from either side, the cams being effective in their function whether the lever is on the right or left side of the case.

Figure 15:
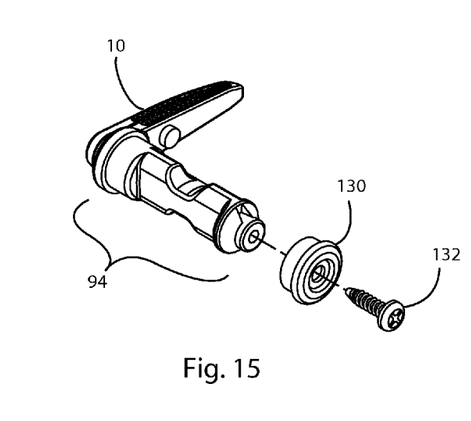
FIG. 15 is an exploded view of parts of the tape brake.
Figure 15A:
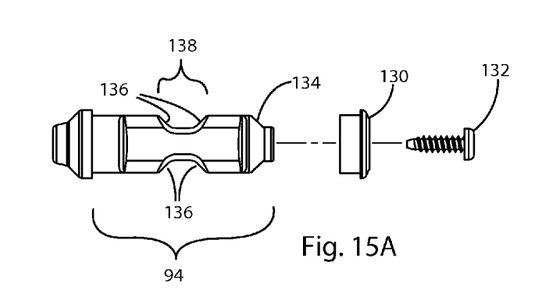
FIG. 15A shows a front view of FIG. 15.

Referring to FIG. 15, the lever (10) is shown in exploded view. The camshaft (94) has a cap (130) on the end held by a screw (132). Referring to FIG. 15A, the end of the camshaft has a chamfered or conical portion (134) that aids in insertion of the shaft through the case, cam shoe, and into the cap. The camshaft has chamfered edges (136) of a narrow portion (138) for the same purpose.

Figure 15B:
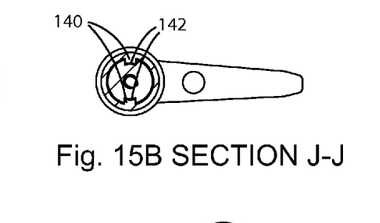
FIG. 15B shows FIG. 15A assembled.

Referring to FIG. 15B, Section J-J, the cap and camshaft mate with interlocking features to prevent rotation and the backing out of the screw. In this case there are bosses (140) on the cap and grooves (142) in the conical portion of the camshaft.

Figure 16:
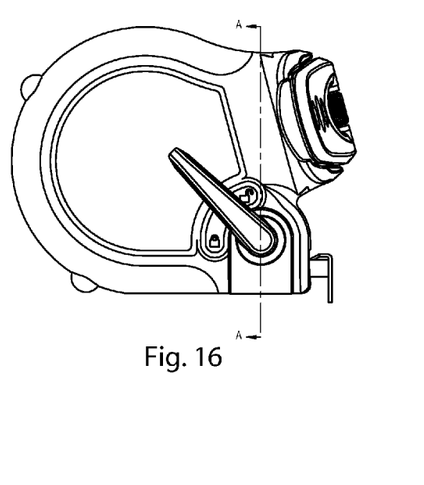
FIG. 16 is a side view of the present invention.
Figure 16A:
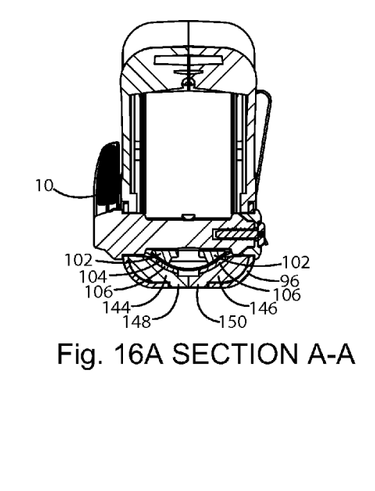
FIG. 16A Section A-A shows a section view of FIG. 16 illustrating the components of the tape brake.
Figure 16B:
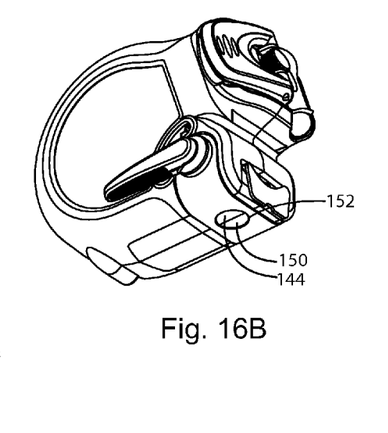
FIG. 16B is a perspective view of the invention from underneath.

Referring now to FIG. 16, the tape measure is shown from the side. FIG. 16A Section A-A, the assembly shows the sides of the housing, the lever, cam shoe, and lever support in a cut-away view. The lever (10) as it rotates down applies pressure on the cam shoe (102), this then applies pressure to the tape (104) which is countered by the rubber clamping surface (106), supported directly underneath by portions of the housing sides (144 and 146), and finally shored up by the lever support (96). Since the shape of the tape is somewhat "v" shaped where the lever shoe contacts it, the sides of the case will tend to separate from each other when pressure is applied. To prevent this, the lever support captures protrusions of the housing (148 and 150), in an opening (152) of the lever support (FIG. 16B).

Figure 17:
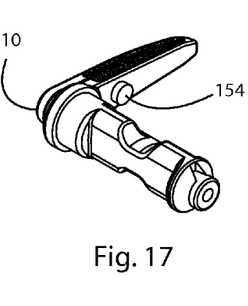
FIG. 17 is a perspective view of a part of the tape brake.
Figure 17A:
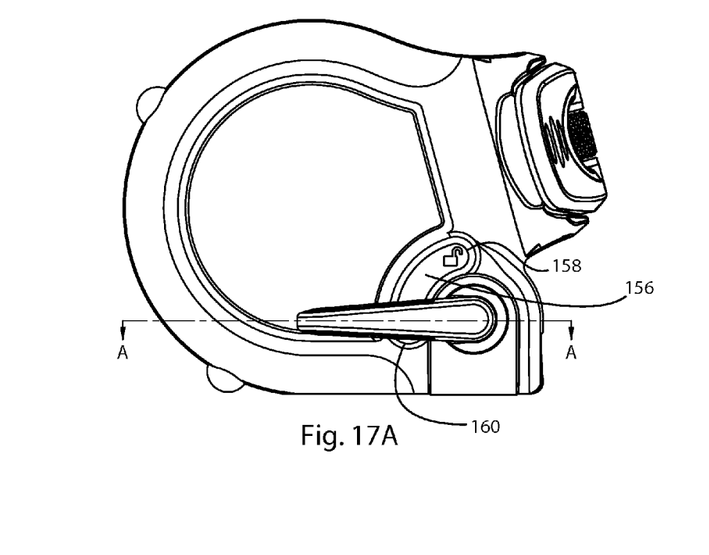
FIG. 17A shows a side view of the present invention.
Figure 17B:
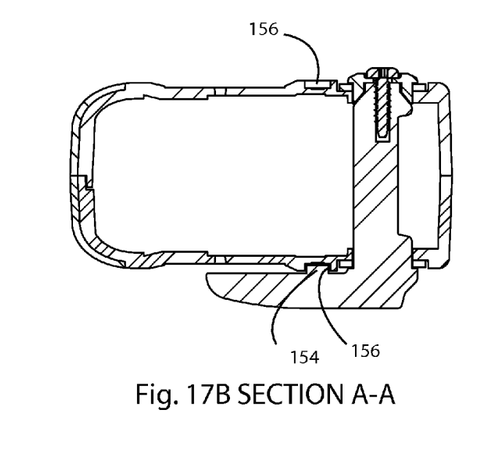
FIG. 17B Section A-A shows a section view of FIG. 17A illustrating parts of the tape brake in the housing.

A rotation limiting means is employed restricting the lever from rotating beyond a particular angle in either direction in relation to the housing. An interference between the lever and the housing stops the lever from continuing rotation in a first direction; another interference limits the rotation in the opposite direction. Referring to FIG. 17, a cylindrical boss (154) protrudes from the inside of the lever (10) and rides inside a curved groove (156), FIG. 17A, in the housing such that the top end (158) of said curved groove and bottom end (160) limit the rotation of the lever when said boss contacts them. This groove is on both sides of the case and will limit the rotation of the lever whether the lever is inserted on the right or left side of the case. It should be noted that it is the concept of an interference that is important; the interference may be bosses, ridges, or any combination of protrusions and/or grooves that achieve these ends. For example, the housing could have protruding bosses spaced apart such that the lever contacts them at various angles.

Figure 18:
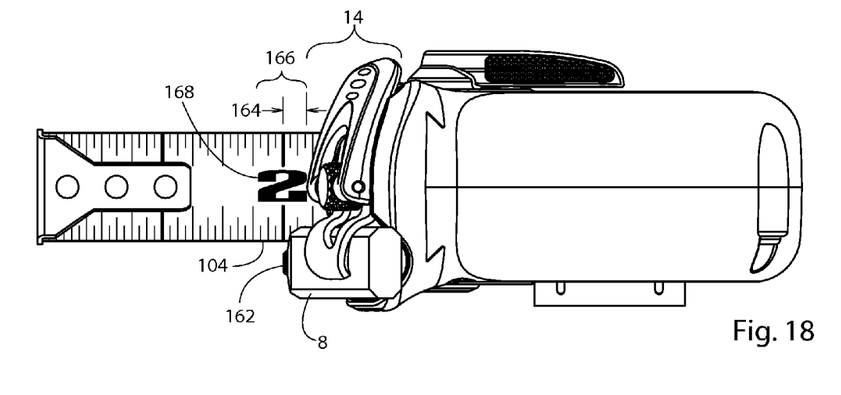
FIG. 18 is a top view of the present invention.

Referring to FIG. 18, a top view of the tape measure is shown with the tape partially extended. The utensil (8) is shown with a utensil tip (162) next to the edge of the tape (104). The tip of the utensil is positioned forward a distance (164) from the front of the tape measure housing, particularly forward of the utensil clamping means (14). This allows a wider viewing area (166) of the tape near where the utensil tip is lined up with the tape, making the identification of the measurement easier. In this case a "2" (168) is shown in clear view.

Figure 19:
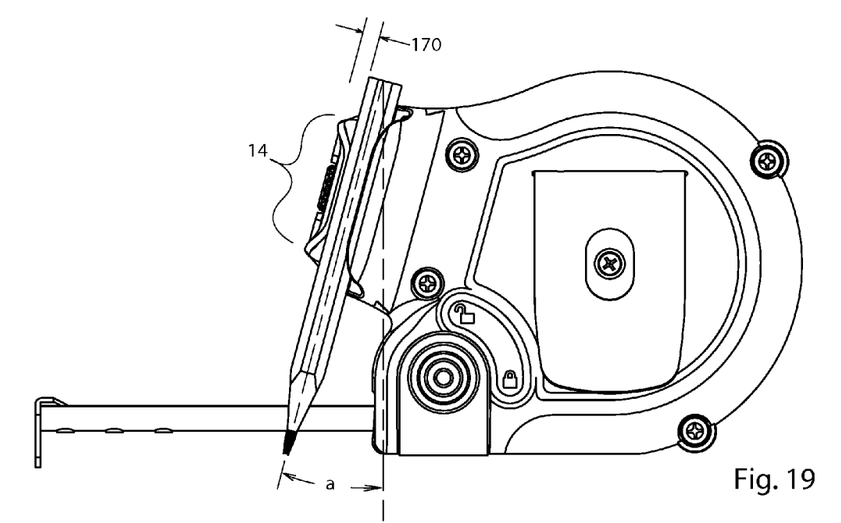
FIG. 19 is a side view of the present invention.

Referring to FIG. 19, a side view of the tape measure with the utensil is shown illustrating an angle (a) at which the utensil is tilted forward at the bottom. The utensil clamping means (14) is designed to protrude forward of the utensil only a minimal amount (170). The combination of the angle and the minimal amount of protrusion of the utensil clamping device allows a clear view of the tape around the location of the tip, as previously illustrated in FIG. 18.

Figure 20:
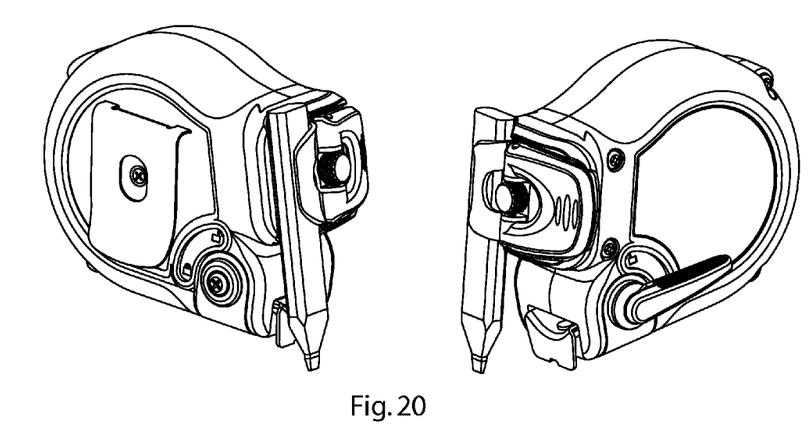
FIG. 20 shows two perspective views of the present invention with the utensil holding device positioned with the utensil on the left and the tape brake on the right.

FIG. 20 shows two views of the tape measure with the utensil clamping device in one position (utensil on the right) and the lever in one position (left side of housing) with the belt clip on the opposite side of the housing from the lever.

Figure 21:
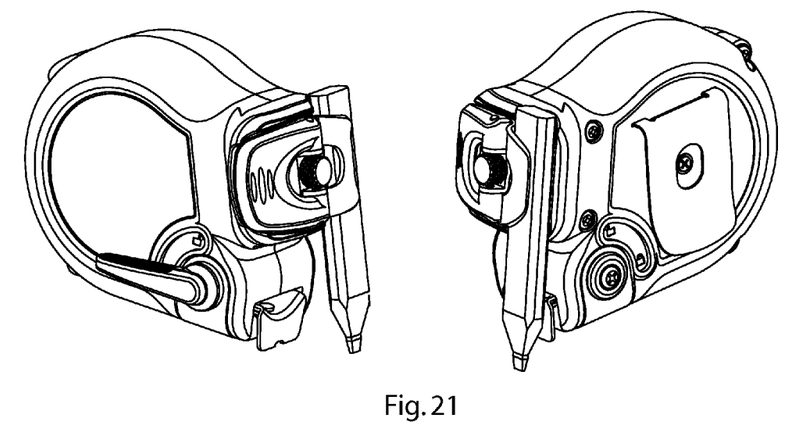
FIG. 21 shows the same perspective views of FIG. 20 but with the utensil holding device and tape brake in opposite positions.

FIG. 21 shows two view of the tape measure with the utensil clamping device, lever, and belt clip arranged to the opposite sides shown in FIG. 20.

The above descriptions are the preferred embodiment and are provided as one means of configuring the present invention, but there are also other embodiments that may be employed that do not depart from the nature of the invention. The drawings, descriptions and objectives are not to be taken as limiting the invention as many other configurations and advantages will become apparent to a craftsperson using this invention. Future embodiments of this invention are confidently expected to be developed, manufactured, and employed in useful work.

Other configurations of the present invention may be executed. Component and device forms, materials, and sizes may be changed without departing from the nature of the invention. Component and device positions, relations, configurations, means of activating; not specifically limited by the claims, are also available to be explored in other embodiments.

Examples of this would be placing the utensil holding device on another part of the housing, on the rear, underneath, or on top with the utensil tip disposed in another direction, such as pointing backwards or up. There also may be a plurality of components to the device or a plurality of devices such as the utensil holding device or the tape brake or other novel features described. New utensils may be developed, thus requiring new forms of the utensil positioning means. The utensil holding device may be integrated into the housing without a detachable portion, maintaining only one position for the device. The tape brake may be restricted to only one side of the housing as well; or requiring only one hole in the housing, or changing the shape or position of the cams, etc.

I claim:

1. A tape measure having an extendable recoiling graduated flexible tape, a housing substantially surrounding said tape when recoiled, an opening in said housing through which the tape is extended, a brake to hold the tape at a specified length when extended, and integrated into said housing a utensil holding device comprising:
    (a) a utensil positioning means in said housing for positioning a variety of shaped utensils such that the working ends of the utensils may affect various materials at said specified length;
    (b) a utensil clamping device for securing utensils in said utensil positioning means;
    (c) a hinged cam incorporated into said utensil clamping device providing force when said hinged cam is rotated in a first direction, securing the utensil in said utensil positioning means, and releasing force when the cam is rotated in the opposite direction from said first direction.

2. The article in claim 1 further including a removable attachment to the housing which incorporates said utensil positioning means and said utensil clamping device.

3. The article in claim 2 wherein said removable attachment may be affixed to the housing in a secondary position.

4. The article in claim 1 wherein said utensil positioning means is a concave groove.

5. The article in claim 1 further including a pivoting ridged jaw to transfer force from the hinged cam to the utensil.

6. The article in claim 1 further including an adjustment means incorporated in said utensil clamping device.

7. The article in claim 6 wherein said adjustment means is a threaded thumb screw.

8. The article in claim 7 further including an opening in the hinged cam through which said threaded thumb screw may be manipulated by the user.

\* \* \* \* \*